United States Patent Office 3,652,633
Patented Mar. 28, 1972

3,652,633
PRODUCTION OF PHOSPHORUS SULFITOBETAINES
Harry Distler, Ludwigshafen, and Rudi Widder, Eppelheim, Germany, assignors to Badische Anilin- & Soda-Fabrik Aktiengesellschaft, Ludwigshafen (Rhine), Germany
No Drawing. Filed Aug. 4, 1969, Ser. No. 847,434
Claims priority, application Germany, Aug. 13, 1968,
P 17 93 184.9
Int. Cl. C07c 137/00
U.S. Cl. 260—456 R          10 Claims

ABSTRACT OF THE DISCLOSURE

Production of phosphorus sulfitobetaines by reaction of tertiary phosphines with 1,2-glycol sulfites. The products are catalysts for the oxyalkylation of saturated or unsaturated carboxylic acids and starting materials for the production of dyes, detergents, wetting agents, finishing agents and pesticides.

---

This invention relates to a process for the production of phosphorus sulfitobetaines by reaction of tertiary phosphines with 1,2-glycol sulfites.

It is known that phosphorus sulfonatobetaines can be prepared by reaction of tertiary phosphines and sultones (cyclic anhydrides of organic hydroxysulfonic acids) (German Pat. 937,949; U.S. Pat. 2,828,332). The production of phosphorus sulfitobetaines has not hitherto been described in the literature.

An object of this invention is a new process for producing phosphorus sulfitobetaines starting from easily accessible starting materials, by a simple method and in good yields and high purity.

This and other objects of the invention are achieved and phosphorus sulfitobetaines having the general formula

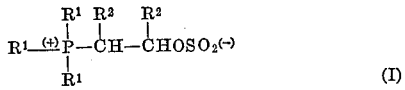

where the individual radicals $R^1$ and $R^2$ may be identical or different and each denotes an aliphatic, cycloaliphatic, araliphatic or aromatic radical, moreover the individual radicals $R^2$ may also each denote a hydrogen atom and/or two individual radicals $R^1$ together with the adjacent phosphorus atom may denote members of a heterocyclic ring, are advantageously obtained when tertiary phosphines having the general formula:

where $R^1$ has the above meanings are reacted with 1,2-glycol sulfites having the general formula:

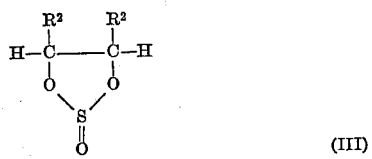

where $R^2$ has the above meanings.

When triphenyl phosphine and 1,2-glycol sulfite are used, the reaction may be represented by the following equation:

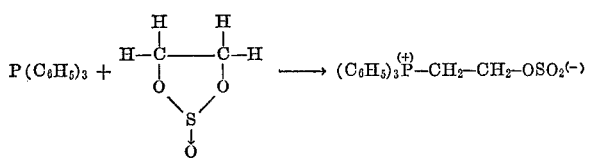

The process according to the invention using easily accessible starting materials surprisingly gives a large number of phosphorus sulfitobetaines in good yields and with high purity and is easy to carry out.

Preferred starting materials (II) and accordingly preferred end products (I) are those in whose formulae the individual radicals $R^1$ are identical or different and each denotes an alkyl radical having from one to eighteen, preferably from one to twelve, carbon atoms, a cycloalkyl radical having from five to seven carbon atoms, an aralkyl radical having from seven to twelve carbon atoms or an aryl radical having from six to ten carbon atoms, or two of the individual radicals $R^1$ together represents an alkylene group which, with the adjacent phosphorus atom constitute a five-membered or six-membered heterocyclic ring. The said radicals or the heterocyclic ring may bear as substituents groups and/or atoms which are inert under the reaction conditions, for example hydroxyl groups, mercapto groups, alkoxy groups, alkylthio groups, acyloxy groups or acylamido groups, each with up to twelve carbon atoms, chlorine atoms or nitro groups.

For example the following tertiary phosphines may be used as starting material (II): triphenyl, triisobutyl, triethyl, tri-n-butyl, tricyclohexyl, tribenzyl, phenyldimethyl, carbethoxymethyldiphenyl phosphines, 1 - phenylphosphorinane, 1-ethylphospholane and dodecyldimethyl phosphine.

The starting material (II) is generally reacted with the 1,2-glycol sulfite having the general Formula III in stoichiometric amount or in excess, for example in a ratio of from 1 to 4 moles of starting material (II) to each mole of starting material (III). The 1,2-glycol sulfites may be prepared for example by reaction of sulfur dioxide and a 1,2-epoxide.

Compounds which form 1,2-glycol sulfites during the reaction, for example poly-1,2-glycol sulfite, may be used for the reaction. Polyglycol sulfites may be obtained for example by reaction of ethylene oxide with sulfur dioxide in the presence of a thioether catalyst at 0° C.

Preferred starting materials (III) and consequently preferred end products are those in whose formula the individual radicals $R^2$ are identical or different and each denotes a hydrogen atom, an alkyl radical having one to seven carbon atoms, a cycloalkyl radical having five to seven carbon atoms, an aralkyl radical having seven to twelve carbon atoms or a phenyl radical. The individual radicals $R^2$ may be identical with or different from the individual radicals $R^1$. The following are examples of starting materials (III) which are suitable for the process: 1,2-glycol sulfite, 1-methyl-1,2-glycol sulfite, 2-phenyl-1,2-glycol sulfite, 1-cyclohexyl-1,2-glycol sulfite, 2-benzyl-1,2-glycol sulfite and 1,2-dimethyl-1,2-glycol sulfite.

The reaction is carried out as a rule at a temperature of from −10° C. to +200° C., preferably from 20° C. to 150° C., at atmospheric or superatmospheric pressure, continuously or in batches. It is advantageous to use a solvent which is inert under reaction conditions such as water; an alcohol, for example methanol, butanol or cyclohexanol; an aromatic hydrocarbon, for example benzene, toluene, xylene, nitrobenzene or chlorobenzene; a ketone, for example acetone; a chlorohydrocarbon, for example chloroform or ethylene chloride; or mixtures of these solvents.

The reaction may be carried out as follows: a mixture of the starting materials (II) and (III), with or without a solvent, is kept at the reaction temperature for ten to fifteen hours. The end product is then isolated from the reaction mixture by a conventional method, for example by treatment with a suitable solvent such as ether, removal of the solvent, and if necessary subsequent dissolution of the mixture in water and filtration.

The new compounds which can be prepared by the process according to the invention are catalysts for the oxyalkylation of saturated or unsaturated carboxylic acids, for example phthalic acid, terephthalic acid, acrylic acid and methacrylic acid, and valuable starting materials for the production of dyes, detergents, wetting agents, finishing agents and pesticides. Thus for example the reaction of acrylic acid with ethylene oxide to form 1,2-glycol monoacrylate can be catalyzed therewith in an amount of 0.05 to 0.3%, a high-purity end product being obtained. Similarly cotton cloth may for example be impregnated therewith in an amount of 20 to 80 grams per liter of aqueous finishing liquor, dried and the cloth thus given a fireproofing finish without appreciable impairment of its handle.

The invention is illustrated by the following examples. The parts specified in the examples are parts by weight.

EXAMPLE 1

131 parts of triphenyl phosphine and 54 parts of glycol sulfite are kept in a stirred vessel at 120° C. for fifteen hours. The crystalline reaction product is digested with 200 parts of ether and then freed from ether. The residue is dissolved in 750 parts of water with an addition of 2 parts of activated carbon and then reprecipitated. 151 parts (81% of the theory) of triphenyl-2-sulfitoethyl-phosphonium-betaine is obtained which melts at from 270° to 277° C.

EXAMPLE 2

30 parts of tri-n-butyl phosphine and 16 parts of glycol sulfite are kept for twelve hours in a stirred vessel at 110° C. while stirring. The reaction product is cooled and digested with 100 parts of ether. After the ether has been evaporated, 41 parts (89% of the theory) of tri-n-butyl-2-sulfitoethyl-phosphonium-betaine is obtained as a pale brown viscous oil which is readily soluble in water. $n_D^{20}=1.491$.

EXAMPLE 3

As described in Example 1, 131 parts of triphenyl phosphine and 55 parts of polymerized glycol sulfite are kept at 120° C. for about fifteen hours. By the isolation procedure described in Example 1, 150 parts of triphenyl-2-sulfitoethyl-phosphonium-betaine (about 80% of the theory) is obtained as a colorless salt.

What we claim is:

1. A process for the production of phosphorus sulfitobetaines having the general formula:

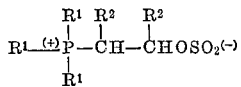

wherein the individual radicals $R^1$ are identical or different and each denotes an alkyl radical having from one to eighteen carbon atoms, a cycloalkyl radical having from five to seven carbon atoms, an aralkyl radical having from seven to twelve carbon atoms or an aryl radical having from six to ten carbon atoms, or two of the individual radicals $R^1$ together represent an alkylene group which, with the adjacent phosphorus atom constitute a five-membered or six-membered heterocyclic ring, or said radicals bearing a substituent or atom which is inert under the conditions of the process and the individual radicals $R^2$ are identical or different and each denotes hydrogen, an alkyl radical having one to seven carbon atoms, a cycloalkyl radical having five to seven carbon atoms, an aralkyl radical having seven to twelve carbon atoms or phenyl, which process comprises reacting a phosphine having the general formula

where $R^1$ has the meaning given above, with a 1,2-glycol sulfite having the general formula:

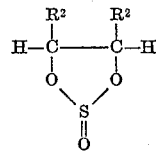

where $R^2$ has the above meaning.

2. A process as claimed in claim 1 wherein said heterocyclic ring is phosphorinane or phospholane.

3. A process as claimed in claim 1 wherein said phosphine is a trialkyl phosphine having respective alkyl groups of 1–12 carbon atoms, tricyclohexyl phosphine, triphenylphosphine, tribenzylphosphine, or phenyldimethylphosphine.

4. A process as claimed in claim 3 wherein said sulfite is 1,2-glycol sulfite, 1-methyl-1,2-glycol sulfite, 2-phenyl-1,2-glycol sulfite, 1-cyclohexyl-1,2-glycol sulfite, 2-benzyl-1,2-glycol sulfite or 1,2-dimethyl-1,2-glycol sulfite.

5. A process as claimed in claim 1 wherein the reaction is carried out in a ratio of 1 to 4 moles of said phosphine per mole of said sulfite.

6. A process as claimed in claim 1 wherein the reaction is carried out at a temperature of from −10° C. to +200° C.

7. A process as claimed in claim 1 wherein the reaction is carried out at a temperature of from +20° C. to +150° C.

8. A process as claimed in claim 1 wherein the reaction is carried out in a solvent which in inert under the reaction conditions.

9. A process as claimed in claim 1 wherein said sulfite is 1,2-glycol sulfite formed during the reaction from poly-1,2-glycol sulfite.

10. A process as claimed in claim 1 wherein said substituents are selected from the group consisting of alkoxy, alkylthio, acyloxy or acylamido groups, each with up to twelve carbon atoms, hydroxyl, mercapto, chloro or nitro groups, and wherein $R^2$ is a hydrogen atom.

References Cited

UNITED STATES PATENTS 2,828,332   3/1958   Gaertner _____ 260—503 X
3,280,179   10/1966  Ernst _____ 260—501.12
3,346,628   10/1967  Riezebos et al. ____ 260—501.12

OTHER REFERENCES

W. Bissinger et al. "Rearrangement of Alkyl Sulfites to Alkanesulfonate Esters." J. Am. Chem. Soc., vol. 70, pp. 3940–41 (1948).

LEON ZITVER, Primary Examiner

L. B. DE CRESCENTE, Assistant Examiner

U.S. Cl. X.R.

8—116 P; 260—486 B, 475 R